United States Patent

Kazahaya

[11] 4,434,458
[45] Feb. 28, 1984

[54] AUXILIARY CHANNEL FOR DIRECT DIGITAL CONTROL SYSTEM

[75] Inventor: Masahiro Kazahaya, Southampton, Pa.

[73] Assignee: Fischer & Porter Company, Warminster, Pa.

[21] Appl. No.: 305,036

[22] Filed: Sep. 16, 1981

[51] Int. Cl.³ .................. G05B 21/02; G06F 15/46
[52] U.S. Cl. .................................... 364/138; 318/615; 318/636; 364/178
[58] Field of Search ............... 364/138, 139, 172, 178, 364/179, 183; 318/636, 615, 611

[56] References Cited

U.S. PATENT DOCUMENTS

| | | | |
|---|---|---|---|
| 3,273,035 | 9/1966 | Inderhees | 318/615 |
| 3,705,978 | 12/1972 | De Schamphelaere | 364/139 |
| 3,824,387 | 7/1974 | Garst | 364/179 |
| 3,826,903 | 7/1974 | Varasso | 364/138 |
| 3,872,389 | 3/1975 | Willard | 364/139 X |
| 4,118,772 | 10/1978 | Takada | 364/138 X |

*Primary Examiner*—Joseph F. Ruggiero
*Attorney, Agent, or Firm*—Michael Ebert

[57] ABSTRACT

An auxiliary channel coupled to a selected loop in a plurality of process control loops included in a direct digital control system, the channel serving to expand the frequency response of the selected loop. The system is provided with a digital computer acting as an electronic controller common to all loops, each loop including a transducer sensing a particular process variable to produce a corresponding analog input signal which is digitized and compared in the computer with a set point signal to yield, after conversion, an analog output signal for operating a final control element in the loop to correct for process variations. The analog input signals from the respective loops are sequentially fed into the computer through a multiplexer at a relatively slow sampling rate whereby the loops are normally responsive only to the low-frequency component in the sampled process variables representing slow changes. The input signal from the selected loop is also fed into the auxiliary channel which includes a filter that passes the high-frequency component in the process variable to an amplifier whose output and the output signal from the selected loop are applied to an adder to produce a composite output signal for operating the final control element in a manner rendering the selected loop responsive to the full range of slow and rapid process variations.

8 Claims, 3 Drawing Figures

AUXILIARY CHANNEL FOR DIRECT DIGITAL CONTROL SYSTEM

BACKGROUND OF THE INVENTION

This invention relates generally to a direct digital control system, and more particularly to an auxiliary channel operating in conjuction with a selected loop in the plurality of process control loops included in the system to expand the frequency response of the selected loop so that it is responsive to the full range of slow and rapid process variations without interfering in any way with the normal operation of the system.

The expression "direct digital control" or "DDC" as it is commonly abbreviated, refers to the use of a digital computer on a time-shared or multiplexing basis for the control of industrial processes such as those involved in the petroleum and chemical industries. A DDC system therefore includes a plurality of process control loops, each controlling a particular activity. The factor controlled may be flow rate, pressure, viscosity, liquid level, or any other process variable.

In a conventional process control loop, an analog electronic controller acts to determine the deviation of the analog signal generated by a transducer which senses the process variable from a set point and produces a corrective analog output signal that depends on the deviation, the output signal being applied to a final control element correcting the process.

A conventional electronic controller is arranged to operate in a proportional, integral or derivative action mode, or in a combination thereof. Proportional action produces a corrective output signal proportional to the deviation of the process variable signal from the set point. The amount of deviation in terms of percentage required to move the final control element through the full range is known as the proportional band. Integral or reset action produces an output signal that is a function of the length of time controlled process variable has been away from the set point. In derivative or rate action, the resultant corrective signal is proportional to the rate at which the process variable is changing.

In a DDC system, the digital computer therein is common to a plurality of analog process control loops. Because the computer operates on digital data, the analog process variable signal from each transducer must be converted into a corresponding digital value and the computer output must be converted into an analog output signal for operating the associated final control element. Set points are given to the computer from a digital terminal. Also included is a multiplexer, which supplies the respective analog input signals from the several loops to the common computer in sequence, so that the input signals are sampled. Means are also provided to hold the output signals derived from the sampled loops so that no interruption occurs in the signals fed to the associated final control elements.

Typically, the sampling rate in a DDC system is no more than one sample per second. When in a given system each process variable is undergoing change at a relatively slow rate, a sampling rate of one-per-second is generally adequate to cope with these slow changes and to effect corrections therefor through the final control elements.

The concern of the present invention is with regard to those process control loops in a DDC system which respond to a process variable subject to change at a relatively rapid rate. When the sampling speed is one-per-second, then the corner or break frequency of the loop may be lower than 0.5 Hz; and if the process variable is undergoing change at a relatively rapid rate, the loop will then be incapable of adequately responding to the process variable to effect the necessary correction.

One obvious solution to this problem is to design a DDC system with a much higher sampling speed; but to do so would unduly complicate the circuit design of the system and add substantially to the cost thereof.

Another approach to the problem is to provide separate analog electronic controllers only for those loops requiring a high-frequency response, the other loops which are responsive to low-frequency process variables lying within the system. Thus if there are sixteen loops to be controlled, and five of these require high frequency operation, then eleven loops will be included in the DDC system and five will be operated through individual analog process controllers. This hybrid system is not only a relatively costly solution to the problem, but it also has operational disadvantages, for the operator would have to run the overall system from more than one place; for he would have to operate the DDC system from its local control terminal and at the same time operate the analog controllers from their respective front panels.

SUMMARY OF INVENTION

In view of the foregoing, the main object of this invention is to provide in conjunction with a standard DDC system in which analog input signals from a plurality of process control loops are sequentially sampled at a relatively slow rate, an auxiliary channel for each loop in the system in which the process variable being sensed is subject to changes at a relatively rapid rate, the channel serving to expand the frequency response of that loop so that the loop is then capable of correcting for the full range of slow and rapid variations in the process being controlled.

More particularly, an object of this invention is to provide a low-cost and efficient auxiliary channel adapted to expand the frequency response of a selected loop in a DDC system without interfering with the normal operation thereof.

A significant feature of the invention resides in the fact that the auxiliary channel constitutes a self-sufficient unit which may be readily plugged into an existing DDC system to enhance the frequency response of a selected process control loop therein. Thus in an industrial plant in which there are a large number of processes to be controlled, some of which involve rapidly changing process variables, where use is made of a standard DDC system to control all of these process variables, the system can then be provided with auxiliary channels only for these control loops subject to the rapidly changing process variables.

Briefly stated, these objects are attained in an auxiliary channel coupled to a selected loop in a plurality of process control loops included in a direct digital control system, the channel serving to expand the frequency response of the selected loop. The system is provided with a digital computer acting as an electronic controller common to all of the loops, each loop including a transducer sensing a process variable to produce a corresponding analog input signal which is digitized and compared in the computer with a set point signal to yield, after digital to analog conversion, an analog output signal for operating a final control element in the loop.

The respective input signals from the loops are sequentially fed into the computer through a multiplexer at a slow sampling rate whereby the loops are normally responsive only to slowly changing process variables. The input analog signal from the selected loop is also fed into the auxiliary channel which is provided with a filter that passes the high frequency component to an amplifier whose output and the output signal from the selected loop are applied to an adder to produce a composite output signal for operating the final control element in a manner rendering the selected loop responsive to the full range of slow and rapid process variables.

OUTLINE OF DRAWINGS

For a better understanding of the invention as well as other objects and further features thereof, reference is made to the following detailed description to be read in conjunction with the accompanying drawings, wherein:

FIG. 1 schematically shows a standard form of DDC system operating in conjunction with a plurality of conventional process control loops; one such loop being illustrated;

DESCRIPTION OF INVENTION

Standard DDC System

In the "DCI-4000" Distributed Control Instrumentation manufactured by Fischer & Porter of Warminster, Pa., and described in their DCI-4000 Product Bulletin 40-2 (1979), the instrumentation includes a group of direct digital control systems, each having a Local Operator's Panel as a man-machine interface on which process variables and set points are indicated and through which a process operator manipulates the DDC system.

Figure 1:
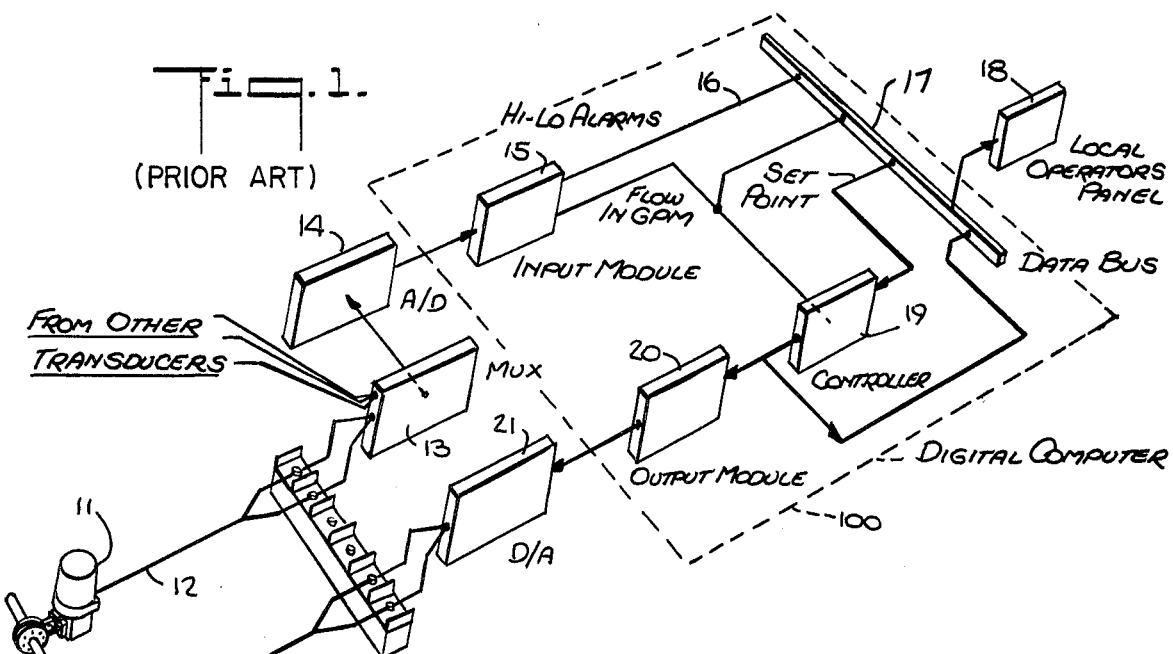

FIG. 1 shows one of the DDC systems included in the DCI-4000 instrumentation in conjunction with one process control loop which acts to control fluid flow through a process line 10. The process variable in this instance is a fluid whose flow rate is metered by a transducer 11 in the form of an orifice plate with a differential pressure transmitter. This transmitter sends out an analog input signal which is applied through line 12 to a multiplexer 13 (mux).

The transducers included in the other control loops in the DDC system are also coupled to multiplexer 13 which acts to sequentially supply the analog signals representing the respective process variables to an analog-to-digital (A/D) converter 14. Each sampled analog signal representing a process variable is thereby converted to a number representing percentage of full scale, the number being entered into a software input module 15. A digital computer 100 functions as input module 15, controller module 19 and output module 20 in a time-shared operation. The modules are pre-programmed functional softwares or subroutines stored in the computer memory.

Input module 15 converts the percentage of full scale to a number representing linear flow, such as gallons per minute (GPM) for a flow signal from the orifice plate. This requires square root extraction in the input module. In addition, the input module can check the existing flow against high and low (Hi-Lo) alarm set points supplied thereto by line 16 coupled to a data bus 17. At this point, the flow in GPM units and the alarm set points are available to external devices such as the Local Operator's Panel 18.

Controller 19 functions for all of the associated control loops and acts to compare the digital input signal provided by input module 15, which represents the flow rate in line 10 with a set point which may be supplied to the controller from Local Operator's Panel 18 via data bus 17.

Controller 19 operates in a proportional (P), integral (I) or in any other predetermined mode appropriate to the processes being controlled. The digital output of controller 19 is fed to an output module 20 which drives a digital-to-analog (D/A) converter 21 to an appropriate milliamp output process control range (i.e., 4 to 20 mA) directly in proportion to the controller's output. D/A converter 21 also performs the necessary function of holding the output signal.

This analog output signal is applied to a final control element 22 interposed in line 10 to correct the flow therein to conform to the set point. In this instance, a pneumatic control valve acts as the final control element; hence the output current of the digital-to-analog (D/A) converter 21 is converted in the current-to-pneumatic device 23 into a corresponding pneumatic signal.

In the DDC system disclosed in FIG. 1, assuming a sampling rate of one sample per second and slowly varying process variables, the response of this DDC system to the sampled variables is sufficient to effect efficient process control.

The present invention is concerned with process variables undergoing rapid changes, as in a plastic extrusion machine or an elastomer roller. The DDC system disclosed in FIG. 1 does not have an adequate response time with respect to process variables subject to rapid changes.

The Auxiliary Channel

Figure 2:
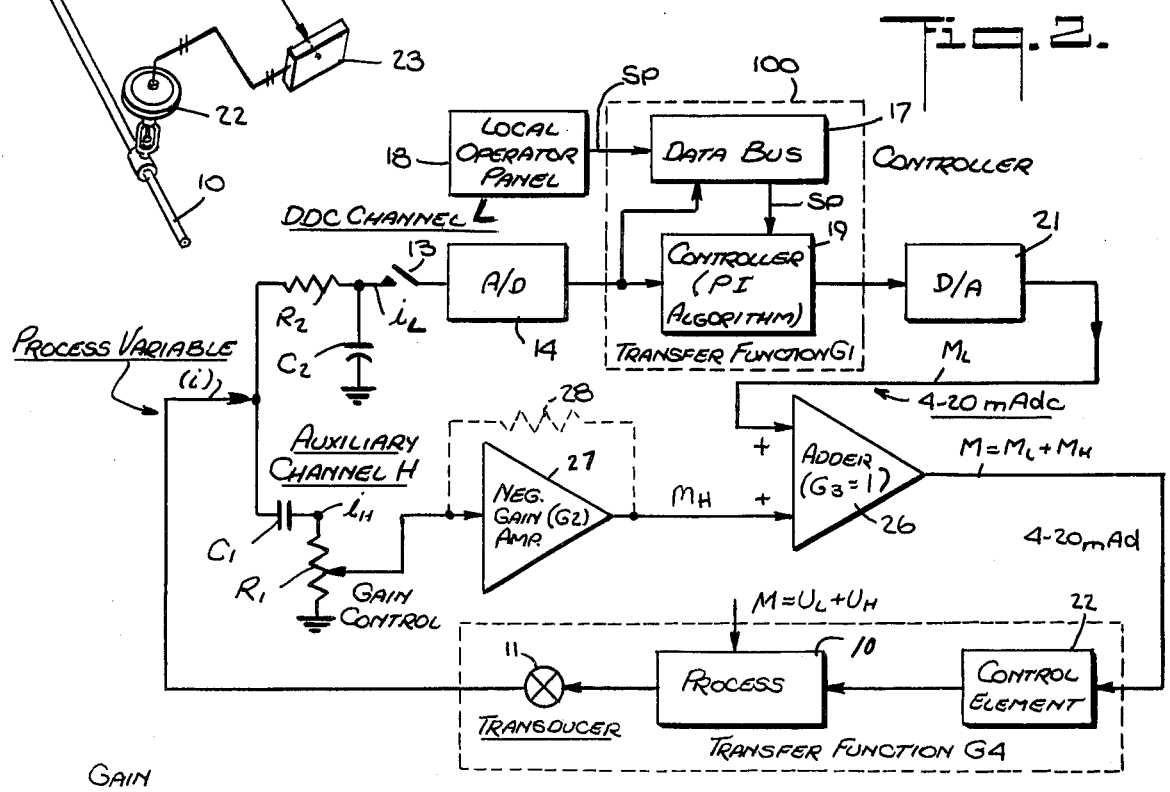
FIG. 2 is a schematic circuit diagram of an auxiliary channel in accordance with the invention for a selected process control loop included in the DDC system.

The auxiliary channel shown in FIG. 2 is associated with a selected process control loop in a DDC system to expand its frequency response so that it can cope with a process variable subject to rapid changes. These changes are reflected in the high-frequency component of the analog signal derived from the process variables. In FIG. 2, the DDC system is shown in simplified form and includes the microprocessor 100 functioning as the common controller 19 for the several loops. The set point SP is supplied to controller 19 of computer 100 by a Local Operator's Panel 18, the controller operating mode being determined by the algorithm in the controller. We shall assume a PI mode.

The selected loop for the rapidly changing process variable includes a transducer 11 which supplies the corresponding process variable signal to the multiplexer 13 through a low-pass filter constituted by resistor $R_2$ and a capacitor $C_2$. The multiplexer feeds the sampled analog signal to A/D converter 14 which supplies the sampled data to the controller in digital terms. The digital output of the computer is converted into an analog signal in the 4 to 20 mAdc range by means including D/A converter 21.

The auxiliary channel H associated with the selected loop includes an adder 26 to one input of which is supplied the analog output signal from D/A converter 21, the output of this adder going to final control element 22.

The process variable analog signal is also applied to the input of auxiliary channel H through a high-pass filter constituted by a potentiometer $R_1$ and a capacitor $C_1$, the filter passing only the high-frequency component of the input signal to a negative gain amplifier 27 whose output is applied to the other input of adder 26. Thus the output of the adder is a composite analog output signal representing the sum of the analog output of DDC channel L and the analog output of the auxiliary channel H. This composite output signal governs the operations of the final control element to effect correction for the full range of slow and rapid process variations.

The frequency bands of the high-pass and the low-pass filters are determined by the corner frequency of the DDC channel so that the high-pass filter passes the high frequency signal above the corner frequency and the low-pass filter passes the lower frequency signal.

Operation

In the arrangement shown in FIG. 2, symbol (i) represents the process variable analog signal transmitted both to DDC channel L and auxiliary channel H from the transducer sensing the process variable subject to rapid changes. The low frequency component of the process variable signal is therefore represented by symbol ($i_L$) and the high-frequency component by symbol ($i_H$).

Consequently, analog signal $i = i_L + i_H$ [Eq. 1]. The high frequency component $i_H$ extracted through high-pass filter $C_1$, $R_1$ does not include a DC component.

The set point is represented by symbol (r). The analog output signal component from DDC channel which acts manipulate the final control element is represented by symbol ($M_L$), and the analog output signal component yielded by amplifier 27 in auxiliary channel H is represented by symbol ($M_H$). Hence the composite analog signal output M of adder 26 which is applied to the final control element is equal to the sum of $M_L$ and $M_H$.

The folowing additional symbols are used:

$G_1$ = transfer function of the DDC system which includes controller 19 operating in the P I mode.
$G_2$ = transfer function of negative gain amplifier 27 and gain controller $R_1$.
$G_3$ = transfer function of adder 26.
$G_4$ = transfer function of the combination of transducer 11 and the process 10 being controlled by final control element 22.
u = the disturbance of the process, this being equal to $u_L + u_H$, where $u_L$ and $u_H$ are low and high frequency components of u, respectively.

Since the set point is not often changed in the DDC arrangement illustrated in FIGS. 1 and 2, the low-frequency component $i_L$ of the variable input signal going into the DDC channel is controlled with respect to set point r (for $i_L$ = r), whereas the high-frequency component $i_H$ is at zero. Hence, the process variable input signal i which is equal to $i_L + i_H$ may be written as:

$$i = r + 0 = r \qquad [\text{Eq. 2}]$$
$$\searrow i_H$$
$$\searrow i_L$$

Equation 2 therefore expresses the aggregate control strategy of the DDC and auxiliary channels operating in conjunction with the selected process control loop.

In regard to the selected process control loop channel L in the DDC system, $M_L$ at the output of adder is given by:

$$M_L = G_3 \cdot G_1 (i_L - r) \qquad [\text{Eq. 3}]$$

$$= G_3 \cdot \frac{100}{P_L} \left[ (i_L - r) + \frac{1}{R} \int (i_L - r) dt \right]$$

where,
$P_L$ is the proportional band
R is the reset time.
By designing adder 26 for $G_3 = 1$, then $$M_L = \frac{100}{P_L} \left[ (i_L - r) = \frac{1}{R} \int (i_L - r) dt \right] \qquad [\text{Eq. 4}]$$

This is the familiar proportional-integral (P-1) control equation. It is known that this equation serves to regulate low-frequency component $i_L$ with reference to set point r against disturbance $u_L$. But it is unresponsive to distrubance $u_H$.

In regard to the auxiliary channel H:

$$M_H = -G_2 i_H \qquad [\text{Eq. 5}]$$

$$i_H = G_4 \cdot M_H + u_H \qquad [\text{Eq. 6}]$$

From equations [5] and [6], it follows that:

$$i_H = -G_2 G_4 i_H + u_H \qquad [\text{Eq. 7}]$$

$$i_H = \frac{u_H}{1 + G_2 G_4}$$

or if $G_2 G_4 >> 1$, $$i_H = \frac{u_H}{G_2 G_4} \qquad [\text{Eq. 7'}]$$

By designing the gain of amplifier 27 so that transfer function $G_2$ is high, the high-frequency component $i_H$ may be made small or negligible. However, if the gain $G_2$ is set too high in relation to the process transfer function $G_4$, the process variable $i_H$ may oscillate with a consequent loss of control. This is the reason for potentiometer $R_1$ in the auxiliary channel, for it makes it possible in any given installation to adjust gain $G_2$ to a high level, but below the point of oscillation.

Another way to adjust gain $G_2$ is to provide negative feedback in amplifier 27. This is realized by connecting the output of amplifier 27 to the input thereof therough a resistor 28 whose value is adjustable to provide a proper value of gain $G_2$ to avoid oscillation. when use is made of negative feedback, potentiometer $R_1$ may be replaced by a fixed resistor.

It is to be noted that equations [5], [6] and [7] do not include the set point term r, which is why there is no need to apply the set point to the auxiliary channel H, thereby simplifying the construction of the auxiliary channel unit. Equations [4] and [7] satisfy the goal of the invention ex-expressed by equation [2].

In the above discussion, it has been assumed that the set point is fixed. When, however, the set point is changed, the system responds to this change through the low-frequency DDC channel L to which the set point is applied.

Frequency Response

Figure 3:
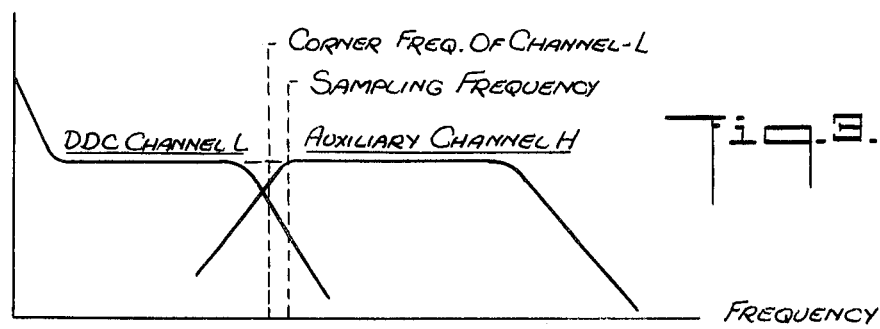
FIG. 3 is a frequency-gain diagram showing the overall frequency response of the selected process control loop which includes the auxiliary channel.

The frequency-gain characteristics of the DDC system having an auxiliary channel H associated therewith is illustrated in the frequency gain diagram in FIG. 3. It will be seen that the gain of DDC channel L drops sharply above its corner frequency.

The time constant of the filter $R_1$-$C_1$ in the high-frequency auxiliary channel H is adjusted to the corner frequency of DDC channel L. In this way, channel H will have a gain above the corner frequency. When the signals $M_L$ and $M_H$ from channels L and H are summed in analog adder 26, the total frequency response is expanded to the upper corner frequency of the high-frequency auxiliary channel H, this frequency being far higher than that of the DDC channel L. In this way the total system posses a gain above the corner frequency.

The auxiliary channel acts only as a proportional controller. Because it is handling only the high-frequency component of the process variable and discriminates against the d-c or low-frequency component, it does not give rise to offset, and for the same reason there is no need to apply the set point SP to this channel. Set point SP is set digitally to the P-I algorithm into controller 19; and since it is in digital form, it is highly stable in a long-term operation.

While there has been shown and described a preferred embodiment of an auxiliary channel for direct digital control system in accordance with the invention, it will be appreciated that many changes and modifications may be made therein without, however, departing from the essential spirit thereof,

I claim:

1. In combination with a direct digital control system provided with a digital computer common to a plurality of process control loops, each having a transducer sensing a respective process variable to produce an input analog signal dependent thereon, and a final control element to correct the process and responsive to an output analog signal derived from the output of the computer in which each process variable is compared with a set point, the input analog signals from the transducers being sequentially applied to the input of the computer at a relatively slow sampling rate through an analog-to-digital converter; an auxiliary channel associated with a selected loop included in the system to expand its frequency response beyond the response dictated by the slow sampling rate, said auxiliary channel comprising means responsive only to the high-frequency component of the analog input signal from the selected loop to produce an output analog signal proportional thereto which is combined in an adder with the output analog signal derived from the computer to produce a composite signal which is applied to the final control element to effect correction of the process throughout the full range of slow and rapid process changes.

2. The combination as set forth in claim 1, including a high pass filter to derive the high-frequency component from the analog input signal.

3. The combination as set forth in claim 2, wherein said filter includes a capacitor to exclude direct current.

4. The combination as set forth in claim 3, wherein said filter further includes a potentiometer.

5. The combination as set forth in claim 1, wherein said input signals are sequentially applied to said computer through a multiplexer.

6. The combination as set forth in claim 5, wherein the analog input signal is applied to the multiplexer through a low-pass filter.

7. The combination as set forth in claim 2, wherein the output of the high pass filter is applied through a high gain amplifier to said adder.

8. The combination as set forth in claim 7, wherein said amplifier has an adjustable output-to-input feedback ratio.

* * * * *